United States Patent Office 3,011,901
Patented Dec. 5, 1961

3,011,901
CERAMIC PIGMENT COMPOSITIONS
Karl W. Traub, Niagara Falls, Leon J. Frost, Lewiston, and William J. Baldwin, Amherst, N.Y., assignors to National Lead Company, New York, N.Y., a corporation of New Jersey
No Drawing. Filed June 19, 1958, Ser. No. 742,983
10 Claims. (Cl. 106—299)

This invention relates to ceramic pigment compositions. It is particularly concerned with those ceramic pigment compositions which are principally composed of zirconia and vanadium pentoxide and are used for producing a yellow color with ceramic ware.

Ceramic pigments formed by heating together $ZrO_2$ and $V_2O_5$ or ammonium vanadate have been of considerable interest to the ceramic industry for a number of years. Hitherto, however, some difficulty has been encountered in producing pure yellow colors with such pigments and in achieving the color densities desired. It appears from study of the prior art that the presence in such pigment compositions of silica or alkalis is undesirable since when silica is present the yellow colors obtained have a greenish hue and alkalis cause loss in color intensity. It has also been discovered in practical use of ceramic pigments of the $ZrO_2$—$V_2O_5$ type that a very objectionable, fine surface pitting often occurs on ceramic glazes in which they are employed.

It has now been discovered that if small amounts of $B_2O_3$ are present in ceramic pigment compositions of the $ZrO_2$—$V_2O_5$ type a very bright yellow glaze color is obtained in use even when silica is present. Moreover, there is no discernible tendency toward the surface pitting mentioned above when such pigments are used in glazes.

It is an object of the present invention to produce a ceramic pigment composition of the $ZrO_2$—$V_2O_5$ type which may be employed to impart a yellow color to glazes and may also be used in enamels or as a body color.

Another object of the present invention is to produce a ceramic pigment of the character described which may be used in ceramic glazes without producing a surface pitting thereof.

A further object of the present invention is to produce a ceramic pigment composition of the character described using commercially available, reasonably priced zirconium oxide.

Other objects and advantages of the present invention will be apparent from the following description of the invention and the accompanying claims.

As indicated above, a great deal of practical experimentation with pigments of the $ZrO_2$—$V_2O_5$ type has shown that if silica is present in the composition, there is a tendency toward increasing blueness resulting in the production of a greenish tint in glazes with which they are used. This difficulty may be overcome by the use of a highly purified zirconia. Since, however, such zirconia products are not in commercial use, the expense involved in this is prohibitive for many purposes. It is highly desirable, therefore, to produce a ceramic pigment composition of the $ZrO_2$—$V_2O_5$ type which will be free from the objections to previous pigments of this type and permit the use of commercially available zirconium oxides which are not chemically pure. One such grade of zirconia which is extensively used as a ceramic opacifier contains about 1% $Na_2O$ and from about 1%–5% $SiO_2$. This and other technical grades of $ZrO_2$ containing small amounts of silica sell for only about half the price of a zirconium oxide which is virtually free of silica and alkali.

In the following examples the preparation of ceramic pigment compositions according to the present invention is described and there is also set forth the way in which they are used with typical glazes, ceramic bodies, and enamels.

EXAMPLE 1

A batch consisting of:                      Parts by weight
Commercial $ZrO_2$(A)------------------------------- 100
Ammonium vanadate------------------------------- 3
Orthoboric acid---------------------------------- 3

*Note A.*—The zirconia used contained as impurities small amounts of silica and other oxides amounting to about 6.4%. Allowance for such impurities was made in making the zirconia addition to the mix.

all in finely divided form (preferably 325 mesh or finer) was thoroughly mixed together with a little water to prevent dusting and calcined at a temperature of about 2380° F. in a normal oxidizing atmosphere. The calcined ceramic pigment mass, analyzing $ZrO_2$ 90.6%, $V_2O_5$ 2.1%, $B_2O_3$ 1.5%, impurities 5.8%, was crushed and added to a tile glaze raw mix made up of:

Percent
Feldspar ---------------------------------------- 34.5
Whiting ----------------------------------------- 15.5
Zinc oxide--------------------------------------- 11.5
Flint -------------------------------------------- 27.5
Kaolin ------------------------------------------- 6.0
Kentucky ball clay------------------------------- 5.0 in a ratio by weight of 1:10. The combined glaze and pigment composition was ball milled with 80% water until at least 98% passed a 325 mesh screen and the resultant slurry was then applied by spraying to a conventional, commercial, talc-type wall tile. The coated tile was fired by placing it in a cold kiln and raising the temperature to approximately 2050° F. to fuse the colored glaze. After firing, the glazed surface of the tile was found to have a clean yellow color with no sign of surface pitting.

The use of a novel ceramic pigment according to the present invention in another type of glaze is illustrated in the following example:

EXAMPLE 2

The calcined ceramic pigment produced in Example 1 was mixed, in a ratio of 1:10, with a sanitary ware glaze mix composed of:

Percent
Feldspar ---------------------------------------- 21.2
Whiting ----------------------------------------- 16.0
Zinc oxide---------------------------------------- 6.8
Barium carbonate--------------------------------- 6.2
Exeter clay-------------------------------------- 13.6
Flint -------------------------------------------- 24.6
Zircon opacifier---------------------------------- 11.6

The mixture was ballmilled with 80% water to such fineness that at least 98% thereof passed a 325 mesh screen. The slurry obtained was then sprayed on typical sanitary ware bodies. These bodies were fired to about 2300° F. starting in a cold kiln. The bodies after firing were found to have a satisfactory yellow color. The glaze surface was entirely free from pitting.

As a body color or stain, pigment compositions according to the present invention may be used in accordance with the following example:

EXAMPLE 3

A portion of the ceramic pigment composition described in Example 1 was added to a commercial sanitary ware body composition in a ratio by weight of 1:25, ballmilled with water for sufficient time to insure uniformity of mixing and the desired fineness. The body was then slipcast in conventional manner, dried and fired to about 2400° F. After cooling, the body was found to have a pleasing yellow tint.

The improvement of glazes containing ceramic pigment compositions according to the present invention over glazes containing pigment compositions that are substantially identical except that they do not include boric oxide is most easily demonstrated by comparison of glazed tiles having as stains in the respective glazes the two pigment compositions to be compared. In such a comparison a glazed tile produced in accordance with the procedure set out in Example 1 (this tile being hereinafter designated as Tile 1–a) was compared with a glazed tile (designated as Tile 1–z) prepared in the same way except for omission of the boric acid from the ceramic pigment mix.

Two distinctions were very noticeable—the absence of surface pitting on Tile 1–a and a color difference. The surface of Tile 1–a was very smooth and glossy while that of Tile 1–z was covered with a multitude of very small pits. The glaze of Tile 1–a was a clean yellow while that of Tile 1–z appeared more transparent than that of Tile 1–a and also had a greenish cast.

In order to compare the color and lightness of the glazes on the two tiles, they were tested with a Gardner automatic color-difference meter. This instrument is a tristimulus colorimeter by means of which visual lightness of samples may be determined and colors may be compared. Three dial readings are obtained: and "L" reading for lightness, with higher readings indicating higher lightness values; and "a" reading which is plus for redness, zero for gray, and minus for greenness; and a "b" reading which is plus for yellowness, zero when gray, and minus for blueness.

The tested tiles gave the following results:

Table A

| Tile | L | a | b |
|---|---|---|---|
| 1–a | 77.0 | +2.0 | +35.5 |
| 1–z | 69.8 | +4.1 | +31.2 |

It is thus clearly demonstrated that the inclusion of boric oxide in the ceramic pigment composition gave greater lightness and a purer yellow color to the glaze of Tile 1–a.

As shown in Table B, below, similar improved results are found in glazes containing other ceramic pigments of the $ZrO_2$—$V_2O_5$ type when $B_2O_3$ is incorporated in the pigment.

Table B

| Tile | L | a | b |
|---|---|---|---|
| 2–a | 77.0 | +4.1 | +35.1 |
| 2–z | 69.7 | −1.0 | +32.0 |
| 3–a | 72.2 | +4.9 | +34.6 |
| 3–z | 62.7 | −3.3 | +28.7 |
| 4–a | 70.5 | +7.0 | +37.5 |
| 4–b [1] | 69.2 | +6.7 | +38.5 |
| 4–c [2] | 67.9 | +5.8 | +37.5 |
| 4–z | 62.4 | −3.5 | +33.5 |

[1] Pigment composition contained about 0.75% $B_2O_3$.
[2] Pigment composition contained about 0.5% $B_2O_3$.

In each of the sets in Table B the pigment composition in the glazes on the tiles identified as "a" contained approximately 1.5% $B_2O_3$ while those tiles identified as "z" were identical except for the absence of $B_2O_3$ from the stain used in the glaze. Although it is preferred to use 1.5% $B_2O_3$ in pigment compositions according to the invention even as little as about 0.5% will, as shown in Table B produce a color improvement. The $B_2O_3$ content may, of course, be increased but there is little additional improvement and consequently about 2.5%–3.0% $B_2O_3$ is the practical upper limit. In adding $B_2O_3$ to the raw mix it is preferably added as orthoboric acid. If convenient, however, it may be added as ammonium pentaborate or other boron compound that will form $B_2O_3$ during calcination or as $B_2O_3$ itself.

In forming ceramic pigment compositions according to the present invention the $V_2O_5$ content of the calcined pigment should be at least about 1.5%, and about 2.0% is preferred if uniformity of color is to be obtained. Although larger percentages, up to about 5% of $V_2O_5$ may be employed, no great improvement in the glaze color is obtained thereby. Since vanadium compounds are expensive, use of such larger amounts is not, therefore, usually desirable. The raw mix for the pigment composition may contain $V_2O_5$ as such, or one or more compounds of vanadium, e.g. ammonium vanadate, which form $V_2O_5$ during calcination may be used.

In the case of both the boric oxide and the vanadium oxide it is important that compounds be used which do not add alkalies to the pigment composition. The $ZrO_2$ contents of novel ceramic pigment compositions in accordance with the present invention will vary somewhat in accordance with the amounts of silica and other impurities present. A $ZrO_2$ content within the range from about 87% to about 94% is satisfactory.

In calcining mixtures which are to form pigment compositions according to the invention, a normal oxidizing atmosphere is used in the furnace and a temperature ranging from about 2000° F. to about 2500° F. is employed with optimum results in the range from about 2350° F. to 2400° F.

As mentioned above, the $B_2O_3$ and $V_2O_5$ may be added as decomposable compounds to mixes that are calcined to form novel ceramic pigment compositions according to the present invention. It is also possible, as more fully described below, to employ as the source of both the $ZrO_2$ and the $B_2O_3$ a product made by precalcining an intimate mixture of zirconia and boric oxide, boric acid or a boron compound like ammonium pentaborate which will decompose to $B_2O_3$ during calcination. This precalcined product may be milled to the desired degree of fineness and then be mixed with a suitable vanadium compound in proper proportions to form a raw mix for the pigment compositions. This is illustrated in the following example:

EXAMPLE 4

A mixture of 100 parts of commercial zirconium oxide containing about 6.4% impurities including silica was thoroughly mixed with 3 parts of orthoboric acid and calcined in an oxidizing atmosphere for one hour at 2000° F. The resulting product was milled to a fineness of about 325 mesh, mixed with 3 parts of ammonium vanadate and calcined one hour at 2380° F. After cooling, the pigment composition thus formed was crushed and added to a tile glaze mix of the same composition as set forth in Example 1. The glaze and pigment mixture was then calcined, ballmilled, applied to a tile and fired in the same manner as in Example 1.

After firing, the tile (identified as Tile 5–b) was compared with two other tiles, Tile 5–a and Tile 5–z, fired at the same time and under the same conditions. The glaze of Tile 5–a was substantially identical with that of Tile 5–b except that the $ZrO_2$ and boric acid were not precalcined. Tile 5–z had a glaze containing the same proportions of $ZrO_2$ and $V_2O_5$, but no boric oxide. The results of such comparison are given below:

Table C

| Tile | L | a | b |
|---|---|---|---|
| 5–a | 68.9 | +6.9 | +37.3 |
| 5–b | 70.2 | +8.5 | +38.9 |
| 5–z | 62.1 | −0.3 | +32.8 |

It is evident that the precalcined product gives a yellow glaze of high lightness and good color. It was also found that the surface pitting evident on Tile 5–z was absent from both Tile 5–a and Tile 5–b.

The precalcined $ZrO_2$—$B_2O_3$ product of Example 4 contained about 1.5% $B_2O_3$, 92.5% $ZrO_2$, with the remainder being silica and other impurities. If desired, the percentage of $B_2O_3$ may be varied between about 0.5% and 3.0% of the total with zirconia and impurities making up 100%. The zirconia and decomposable boron compound or $B_2O_3$ may be satisfactorily calcined at temperatures between about 1800° F. and 2000° F.

In the experiments described herein the present novel ceramic pigments have been used in a ratio of 1:10 with the several glaze mixes employed. This proportion gives a good, clean, yellow color in the glazes. However, more or less pigment may be used if desired. In general, the proportion of pigment to glaze mix may vary from about 1:20 to 1:10. The amount employed in any particular case will depend upon the chromaticity desired and also upon the amount and type of opacifier used, if any. When used as body stains the amount employed will, of course, depend on the color desired but usually will be less than 5%. Ceramic pigment compositions of the $ZrO_2$—$V_2O_5$—$B_2O_3$ type described herein may be mixed in suitable proportions with various other pigments in preparing green or orange glazes or ceramic bodies. Although the novel pigments are also useful with porcelain enamels, the percentages required for high color intensity are so large that the cost is in many instances prohibitive.

In the present specification and claims the novel compositions of the present invention are referred to as consisting essentially of $ZrO_2$, $V_2O_5$, and/or $B_2O_3$. In fact, however, it is not known whether in these compositions these oxides exist in the free or the combined state or, if the latter, how they are combined. Accordingly, it is not intended by such reference to describe or imply anything with respect to the actual state of combination of such component oxides. Further, where $V_2O_5$ or $B_2O_3$ is referred to, it is intended to include, where appropriate, compounds of vanadium or boron which under the calcination conditions will form the respective oxide. Percentages and proportions stated in the specification and claims are by weight.

We claim:

1. The product resulting from calcination without fusion of a mixture consisting of from about 0.5% to about 3.0% of $B_2O_3$ with the remainder being essentially zirconia of commercial grade with associated impurities.

2. A ceramic pigment composition adapted to produce a clean yellow color in ceramic glazes without substantial surface pitting of said glazes which consists essentially of from about 87% to 94% $ZrO_2$ exclusive of the impurities including soda and silica associated with commercial grades of $ZrO_2$, from about 1.5% to 5% $V_2O_5$, and from about 0.5% to 3% $B_2O_3$.

3. A ceramic pigment composition as set forth in claim 2 which contains about 2% $V_2O_5$ and from about 0.5% to 3% $B_2O_3$.

4. A ceramic pigment composition as set forth in claim 2 which contains about 1.5% $B_2O_3$ and from about 1.5% to 5% $V_2O_5$.

5. A ceramic pigment composition as set forth in claim 2 which contains about 2% $V_2O_5$ and about 1.5% $B_2O_3$.

6. A ceramic glaze which includes a minor but color-producing amount of a pigment composition defined in claim 2.

7. A ceramic glaze which includes a minor but color-producing amount of a pigment composition defined in claim 5.

8. A ceramic body which includes a minor but color-producing amount of a pigment composition defined in claim 2.

9. A ceramic body which includes a minor but color-producing amount of a pigment composition defined in claim 5.

10. A process for making a ceramic pigment composition adapted to produce a clean yellow color in ceramic glazes without substantial surface pitting of said glazes which comprises calcining at a temperature of from about 2000° F. to 2500° F. a mixture which at the calcination temperature consists essentially of about 87% to 94% $ZrO_2$ exclusive of the impurities including soda and silica associated with commercial grades of $ZrO_2$, from about 1.5% to 5% $V_2O_5$, and from about 0.5% to 3% $B_2O_3$.

References Cited in the file of this patent

UNITED STATES PATENTS

| | | |
|---|---|---|
| 1,001,789 | Weiss | Aug. 29, 1911 |
| 1,314,861 | Eyer | Sept. 2, 1919 |
| 2,438,335 | Earl | Aug. 23, 1944 |
| 2,441,447 | Seabright | May 11, 1948 |
| 2,847,317 | Carnahan et al. | Aug. 12, 1958 |
| 2,875,086 | Weyl | Feb. 24, 1959 |